US012689904B2

(12) United States Patent
Kim

(10) Patent No.: US 12,689,904 B2
(45) Date of Patent: Jul. 21, 2026

(54) METHOD AND APPARATUS FOR DEFENDING AGAINST WIRELESS ATTACK, AND BATTERY PACK INCLUDING THE APPARATUS

(71) Applicant: SAMSUNG SDI CO., LTD., Yongin-si (KR)

(72) Inventor: Minsu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 328 days.

(21) Appl. No.: 18/347,078

(22) Filed: Jul. 5, 2023

(65) Prior Publication Data
US 2024/0259808 A1      Aug. 1, 2024

(30) Foreign Application Priority Data
Feb. 1, 2023     (KR) ........................ 10-2023-0013769

(51) Int. Cl.
H04W 12/122 (2021.01)
H04W 12/125 (2021.01)

(52) U.S. Cl.
CPC ....... H04W 12/122 (2021.01); H04W 12/125 (2021.01)

(58) Field of Classification Search
CPC ............. H04W 12/122; H04W 12/125; H04W 52/0238; H04W 52/0245; H04K 3/42; H04K 3/43; H04K 3/222; H04K 3/224; B60L 3/0046; B60L 3/12
USPC ........................................................ 726/23
See application file for complete search history.

(56) References Cited

U.S. PATENT DOCUMENTS

| | | | | |
|---|---|---|---|---|
| 2,043,416 | A | * | 6/1936 | Lueg ................ G10K 11/17857 181/197 |
| 8,892,903 | B1 | * | 11/2014 | Trimberger ........... G06F 21/755 713/189 |
| 2019/0252735 | A1 | | 8/2019 | Sung et al. |
| 2019/0260097 | A1 | * | 8/2019 | Kwon ................. H02J 7/00036 |
| 2021/0194330 | A1 | * | 6/2021 | Gallagher ........... H01M 10/425 |
| 2021/0265670 | A1 | * | 8/2021 | Choi ................... H04L 43/0817 |
| 2022/0038567 | A1 | * | 2/2022 | Iasso ..................... G06F 1/1632 |
| 2022/0368567 | A1 | | 11/2022 | Brink et al. |
| 2023/0078545 | A1 | | 3/2023 | Rigelsford et al. |

(Continued)

FOREIGN PATENT DOCUMENTS

| | | | | | |
|---|---|---|---|---|---|
| CN | 112260719 | A | * | 1/2021 | ............. H04B 1/715 |
| EP | 4 093 045 | A1 | | 11/2022 | |

(Continued)

OTHER PUBLICATIONS

Junhwan Kim et al., A Study on Backscatter Field Reduction of the Curved Aluminum Plate using Active Cancellation Circuit, The Transactions of the Korean Institute of Electrical Engineers vol. 64, No. 2, pp. 276-279 (Year: 2015).*

(Continued)

*Primary Examiner* — Jahangir Kabir
(74) *Attorney, Agent, or Firm* — Womble Bond Dickinson (US) LLP

(57) ABSTRACT

A method for defending against wireless attack is disclosed, the method including collecting external RF signals through at least one external antenna, determining an attack signal from the external RF signals, and canceling the attack signal.

17 Claims, 8 Drawing Sheets

(56) References Cited

U.S. PATENT DOCUMENTS

| | | | | |
|---|---|---|---|---|
| 2023/0091469 A1* | 3/2023 | Wang | .................... | H04L 9/3278 |
| | | | | 713/189 |
| 2023/0246250 A1* | 8/2023 | Yang | ...................... | H04L 12/40 |
| | | | | 429/50 |
| 2024/0047988 A1* | 2/2024 | Lu | ........................ | H02J 7/1492 |

FOREIGN PATENT DOCUMENTS

| | | | | |
|---|---|---|---|---|
| EP | 4135209 A1 | 2/2023 | | |
| KR | 10-1002640 B1 | 12/2010 | | |
| KR | 10-2137759 B1 | 7/2020 | | |
| KR | 102339826 B1 * | 12/2021 | ......... | H04L 63/1441 |
| KR | 10-2022-0038921 A | 3/2022 | | |
| WO | WO-2021162985 A1 * | 8/2021 | .............. | B60L 58/10 |

OTHER PUBLICATIONS

Platform Software Development for Battery Management System in Electric Vehicle, Shah et al, Feb. 2019 (Year: 2019).*
Extended European Search Report, Corresponding Application No. 23178167.5, dated Nov. 27, 2023, 6 pps.
Korean Office Action for KR Application No. 10-2023-0013769, dated Dec. 10, 2025, 4 pps.
Kim, Junhwan, et al., "A Study on Backscatter Field Reduction of the Curved Aluminum Plate using Active Cancellation Circuit," The Transactions of the Korean Institute of Electrical Engineers vol. 64, No. 2, pp. 276-279, 2015.

* cited by examiner

METHOD AND APPARATUS FOR DEFENDING AGAINST WIRELESS ATTACK, AND BATTERY PACK INCLUDING THE APPARATUS

CROSS-REFERENCE TO RELATED APPLICATION

This application claims priority to, and the benefit of, Korean Patent Application No. 10-2023-0013769 filed in the Korean Intellectual Property Office on Feb. 1, 2023, the entire contents of which are incorporated herein by reference.

BACKGROUND

(a) Field

The present disclosure relates to a method and apparatus for defending against wireless attack, and a battery pack including the apparatus.

(b) Description of the Related Art

Recently, in constructing a battery pack for an electric vehicle, a wireless battery management system (BMS) technology is attracting attention.

A wireless BMS does not need communication wires for communication between modules. According to the elimination of communication wires, the volume of the battery pack can be reduced, and reliability and efficiency can be improved. There is no need to redesign complex wire harnesses when developing a specific communication system or for each new vehicle.

However, there may be problems associated with wireless communication. That is, the wireless BMS may have potential vulnerabilities to external intentional jamming attacks, network traffic sniffing, and network traffic spoofing.

SUMMARY

Embodiments provide a method and apparatus for defending against wireless attack, and a battery pack including the apparatus capable of detecting an external attack coming through a wireless interface, and capable of defending against the external attack.

According to one aspect, a method for defending against wireless attack is provided. The method for defending against wireless attack includes collecting external RF signals through at least one external antenna, determining an attack signal from the external RF signals, and canceling the attack signal.

The determining the attack signal from the external RF signals may include determining a strength of the attack signal is equal to or greater than a second reference value.

The determining the attack signal from the external RF signals may include determining a strength of the attack signal is greater than or equal to a first reference value, and is less than a second reference value, and determining a communication error diagnosis result between at least one slave battery management system (BMS) for detecting information on at least one battery module, and a master BMS for performing communication with the at least one slave BMS.

The determining the attack signal from the external RF signals may include detecting a communication error between the at least one slave BMS and the master BMS.

The determining the attack signal from the external RF signals may include receiving information about a strength of a normal signal transmitted between the at least one slave BMS and the master BMS from the master BMS, determining a difference between the strength of the attack signal and the strength of the normal signal is equal to or greater than a threshold, transmitting a communication diagnostic event trigger to the master BMS, and receiving the communication error diagnosis result.

The determining the attack signal from the external RF signals may include analyzing a strength of the attack signal.

The canceling the attack signal may include generating a canceling RF signal having a same frequency as, and an opposite phase as, the attack signal, and transmitting the canceling RF signal through the external antenna.

The canceling the attack signal may further include adjusting at least one of a frequency and a strength of the canceling RF signal based on a communication error diagnosis result between at least one slave battery management system (BMS) for detecting information on at least one battery module, and a master BMS for performing communication with the at least one slave BMS.

According to another aspect, an apparatus for defending against wireless attack is provided. The apparatus for defending against wireless attack includes at least one external antenna coupled to a battery pack, and configured to receive external RF signals, a signal analyzer configured to analyze the external RF signals, an attack determiner configured to determine an attack signal from the external RF signals using analysis information of the external RF signals, and an attack defender configured to cancel the attack signal.

The attack determiner may be configured to determine the attack signal from the external RF signals based on a strength of the attack signal.

The attack determiner may be configured to determine the attack signal from the external RF signals based on a strength of the attack signal being equal to or greater than a second reference value.

The attack determiner may be further configured to determine a strength of the attack signal is greater than or equal to a first reference value and less than a second reference value, and determine the attack signal from the external RF signals based on a strength of a normal signal transmitted between at least one slave battery management system (BMS) for detecting information on at least one battery module, and a master BMS for performing communication with the at least one slave BMS, and based on a communication error diagnosis result between the at least one slave BMS and the master BMS.

The attack determiner may be configured to determine the attack signal from the external RF signals based on a communication error between the at least one slave BMS and the master BMS being detected.

The apparatus may further include an internal communicator configured to perform wireless communication with the master BMS, wherein the attack determiner is configured to determine that a difference between the strength of the attack signal and the strength of the normal signal is greater than or equal to a threshold, generate a communication diagnosis event trigger, transmit the communication diagnosis event trigger to the master BMS through the internal communicator, and receive the communication error diagnosis result.

The attack defender may be configured to generate a canceling RF signal having a same frequency as, and an opposite phase as, the attack signal, and is configured to transmit the canceling RF signal through the external antenna.

The attack defender may be configured to adjust at least one of a frequency and a strength of the canceling RF signal based on a communication error diagnosis result between at least one slave battery management system (BMS) for detecting information on at least one battery module, and a master BMS for performing communication with the at least one slave BMS.

According to another aspect, a battery pack is provided. The battery pack includes at least one battery module, at least one slave battery management system (BMS) configured to detect information about the at least one battery module, a master BMS configured to perform wireless communication with the at least one slave BMS, and is configured to control the at least one slave BMS based on information about the at least one battery module, and a wireless attack mitigation apparatus configured to defend against a wireless attack, and including at least one external antenna configured to receive external RF signals, a signal analyzer configured to analyze the external RF signals, an attack determiner configured to determine an attack signal from the external RF signals using analysis information of the external RF signals, and an attack defender configured to cancel the attack signal.

DETAILED DESCRIPTION

Figure 1:
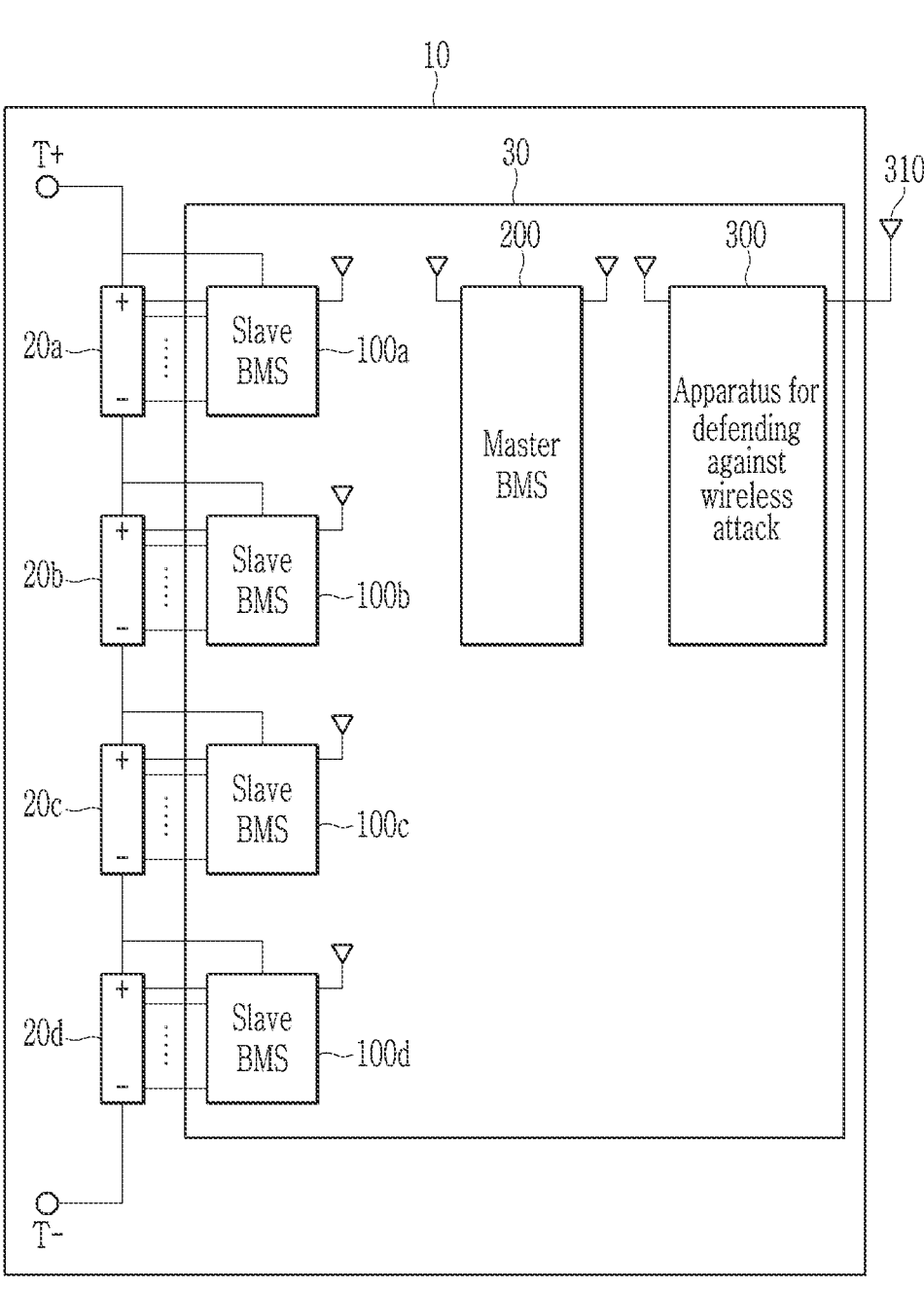
FIG. 1 is a diagram illustrating a battery pack including an apparatus for defending against wireless attack (e.g., a wireless attack mitigation apparatus) according to one or more embodiments.

Aspects of some embodiments of the present disclosure and methods of accomplishing the same may be understood more readily by reference to the detailed description of embodiments and the accompanying drawings. Hereinafter, embodiments will be described in more detail with reference to the accompanying drawings. The described embodiments, however, may have various modifications and may be embodied in different forms, and should not be construed as being limited to only the illustrated embodiments herein. Further, each of the features of the various embodiments of the present disclosure may be combined or combined with each other, in part or in whole, and technically various interlocking and driving are possible. Each embodiment may be implemented independently of each other or may be implemented together in an association. The described embodiments are provided as examples so that this disclosure will be thorough and complete, and will fully convey the aspects of the present disclosure to those skilled in the art, and it should be understood that the present disclosure covers all the modifications, equivalents, and replacements within the idea and technical scope of the present disclosure. Accordingly, processes, elements, and techniques that are not necessary to those having ordinary skill in the art for a complete understanding of the aspects of the present disclosure may not be described.

Unless otherwise noted, like reference numerals, characters, or combinations thereof denote like elements throughout the attached drawings and the written description, and thus, descriptions thereof will not be repeated. Further, parts that are not related to, or that are irrelevant to, the description of the embodiments might not be shown to make the description clear.

In the drawings, the relative sizes of elements and regions may be exaggerated for clarity. The regions illustrated in the drawings are schematic in nature and their shapes are not intended to illustrate the actual shape of a region of a device and are not intended to be limiting. Additionally, as those skilled in the art would realize, the described embodiments may be modified in various ways, all without departing from the spirit or scope of the present disclosure.

In the detailed description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form to avoid unnecessarily obscuring various embodiments.

It will be understood that when an element, layer, region, or component is referred to as being "formed on," "on," "connected to," or "(operatively or communicatively) coupled to" another element, layer, region, or component, it can be directly formed on, on, connected to, or coupled to the other element, layer, region, or component, or indirectly formed on, on, connected to, or coupled to the other element, layer, region, or component such that one or more intervening elements, layers, regions, or components may be present. In addition, this may collectively mean a direct or indirect coupling or connection and an integral or non-integral coupling or connection. For example, when a layer, region, or component is referred to as being "electrically connected" or "electrically coupled" to another layer, region, or component, it can be directly electrically connected or coupled to the other layer, region, and/or component or intervening layers, regions, or components may be present. However, "directly connected/directly coupled," or "directly on," refers to one component directly connecting or coupling another component, or being on another component, without an intermediate component. In addition, in the present specification, when a portion of a layer, a film, an area, a plate, or the like is formed on another portion, a forming direction is not limited to an upper direction but includes forming the portion on a side surface or in a lower direction. On the contrary, when a portion of a layer, a film, an area, a plate, or the like is formed "under" another portion, this includes not only a case where the portion is "directly beneath" another portion but also a case where there is further another portion between the portion and another portion. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

For the purposes of this disclosure, expressions such as "at least one of," or "any one of," when preceding a list of elements, modify the entire list of elements and do not modify the individual elements of the list. For example, "at least one of X, Y, and Z," "at least one of X, Y, or Z," "at least one selected from the group consisting of X, Y, and Z," and "at least one selected from the group consisting of X, Y, or Z" may be construed as X only, Y only, Z only, any combination of two or more of X, Y, and Z, such as, for instance, XYZ, XYY, YZ, and ZZ, or any variation thereof. Similarly, the expression such as "at least one of A and B" and "at least one of A or B" may include A, B, or A and B. As used herein, "or" generally means "and/or," and the term "and/or" includes any and all combinations of one or more of the associated listed items. For example, the expression such as "A and/or B" may include A, B, or A and B. Similarly, expressions such as "at least one of," "a plurality of," "one of," and other prepositional phrases, when preceding a list of elements, modify the entire list of elements and do not modify the individual elements of the list.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure. The description of an element as a "first" element may not require or imply the presence of a second element or other elements. The terms "first," "second," etc. may also be used herein to differentiate different categories or sets of elements. For conciseness, the terms "first," "second," etc. may represent "first-category (or first-set)," "second-category (or second-set)," etc., respectively.

The terminology used herein is for the purpose of describing particular embodiments only and is not intended to be limiting of the present disclosure. As used herein, the singular forms "a" and "an" are intended to include the plural forms as well, while the plural forms are also intended to include the singular forms, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof.

When one or more embodiments may be implemented differently, a specific process order may be performed differently from the described order. For example, two consecutively described processes may be performed substantially at the same time or performed in an order opposite to the described order.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure."

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware, to process data or digital signals. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Circuit hardware may include, for example, application specific integrated circuits (ASICs), general purpose or special purpose central processing units (CPUs) that is configured to execute instructions stored in a non-transitory storage medium, digital signal processors (DSPs), graphics processing units (GPUs), and programmable logic devices such as field programmable gate arrays (FPGAs).

Further, the various components of these devices may be a process or thread, running on one or more processors, in one or more computing devices, executing computer program instructions and interacting with other system components for performing the various functionalities described herein. The computer program instructions are stored in a memory that may be implemented in a computing device using a standard memory device, such as, for example, a random-access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Some embodiments are described in the accompanying drawings in relation to functional block, unit, and/or module. Those skilled in the art will understand that such block, unit, and/or module are/is physically implemented by a logic circuit, an individual component, a microprocessor, a hard wire circuit, a memory element, a line connection, and other electronic circuits. This may be formed using a semiconductor-based manufacturing technique or other manufacturing techniques. The block, unit, and/or module implemented by a microprocessor or other similar hardware may be programmed and controlled using software to perform various functions discussed herein, optionally may be driven by firmware and/or software. In addition, each block, unit, and/or module may be implemented by dedicated hardware, or a combination of dedicated hardware that performs some functions and a processor (for example, one or more programmed microprocessors and related circuits) that performs a function different from those of the dedicated hardware. In addition, in some embodiments, the block, unit, and/or module may be physically separated into two or more interact individual blocks, units, and/or modules without departing from the scope of the present disclosure. In addition, in some embodiments, the block, unit and/or module may be physically combined into more complex blocks, units, and/or modules without departing from the scope of the present disclosure.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

FIG. 1 is a diagram illustrating a battery pack including an apparatus for defending against wireless attack (e.g., a wireless attack mitigation apparatus) according to one or more embodiments.

Referring to FIG. 1, the battery pack 10 may be mounted in various power devices that use electrical energy stored in the battery pack 10, such as an electric vehicle. The battery pack 10 may include a plurality of battery modules 20a, 20b, 20c, and 20d connected in series with each other and the wireless battery management device 30.

The plurality of battery modules 20a, 20b, 20c, and 20d connected in series with each other can be connected to an external charging device or load through system terminals T+ and T−, and can be charged by the charging device, or discharged due to the load.

Each of the battery modules 20a, 20b, 20c, and 20d may include a plurality of battery cells electrically connected to each other in series and/or in parallel.

The wireless battery management device 30 may include a plurality of slave battery management systems (BMS) 100a, 100b, 100c, and 100d and a master BMS 200. Hereinafter, for convenience of explanation, as shown in FIG. 1, it will be described that the battery pack 10 includes four battery modules 20a, 20b, 20c, and 20d, and that the wireless battery management device 30 includes four slave battery management systems 100a, 100b, 100c, and 100d.

The plurality of slave BMSs 100a, 100b, 100c, and 100d may be installed to correspond to the plurality of battery modules 20a, 20b, 20c, and 20d included in the battery pack 10 on a one-to-one basis. Each of the plurality of slave BMSs 100a, 100b, 100c, and 100d may be electrically connected to one battery module in which it is installed among the plurality of battery modules 20a, 20b, 20c, and 20d. For example, the slave BMS 100a may be electrically connected to the battery module 20a, and the slave BMS 100b may be electrically connected to the battery module 20b. The slave BMS 100c may be electrically connected to the battery module 20c, and the slave BMS 100d may be electrically connected to the battery module 20d.

Each of the plurality of slave BMSs 100a, 100b, 100c, and 100d may detect the overall state (e.g., voltage, current, and temperature) of the battery modules 20a, 20b, 20c, and 20d electrically connected thereto, and may perform various control functions (e.g., charging, discharging, balancing) for adjusting the state of the battery modules 20a, 20b, 20c, and 20d. At this time, each control function is directly performed by each slave BMS 100a, 100b, 100c, and 100d based on the state of the battery module 20a, 20b, 20c, and 20d, or may be performed according to a command from the master BMS 200.

The master BMS 200 receives information on the battery modules 20a, 20b, 20c, and 20d from the plurality of slave BMSs 100a, 100b, 100c, and 100d, and may perform control functions, such as state of charge (SOC), power control, cell-balancing control, failure diagnosis control, cooling control, and thermal runaway detection control. In addition, the master BMS 200 may control a relay for supplying and disconnecting the power of the battery modules 20a, 20b, 20c, and 20d to and from the load based on the information of the battery modules 20a, 20b, 20c, and 20d.

The master BMS 200 may be connected to a plurality of slave BMSs 100a, 100b, 100c, and 100d using a wireless network as a connection method.

Through a wireless connection between the master BMS 200 and the plurality of slave BMSs 100a, 100b, 100c, and 100d, communication wiring complexity may be reduced, the volume of the battery pack 10 may be reduced, and cost may be reduced. However, the wireless connection may have potential vulnerabilities to wireless attacks, such as external intentional jamming attacks, network traffic sniffing, and network traffic spoofing attacks.

To defend against such wireless attacks, the wireless battery management device 30 according to one or more embodiments may include an apparatus for defending against wireless attack (e.g., a wireless attack mitigation apparatus) 300. Alternatively, the wireless attack mitigation apparatus 300 may be implemented inside the battery pack 10 separately from the wireless battery management device 30.

The wireless attack mitigation apparatus 300 may include at least one external antenna 310.

The at least one external antenna 310 may be located on a surface of a metal layer surrounding the battery pack 10. Although one external antenna 310 is shown in FIG. 1 for convenience, two or more external antennas 310 can be located on the surface of a metal layer surrounding the battery pack 10 according to the shape of the battery pack 10, or according to the characteristics of the external antenna 310. The wireless attack mitigation apparatus 300 may be connected to the master BMS 200 using a wireless network as a connection method.

The wireless attack mitigation apparatus 300 may collect RF signals received from at least one external antenna 310 and, if the collected RF signals are determined to be attack signals, may perform an operation to cancel the RF signals corresponding to the attack signals. By doing this, the wireless attack mitigation apparatus 300 may defend against external attacks.

Figure 2:
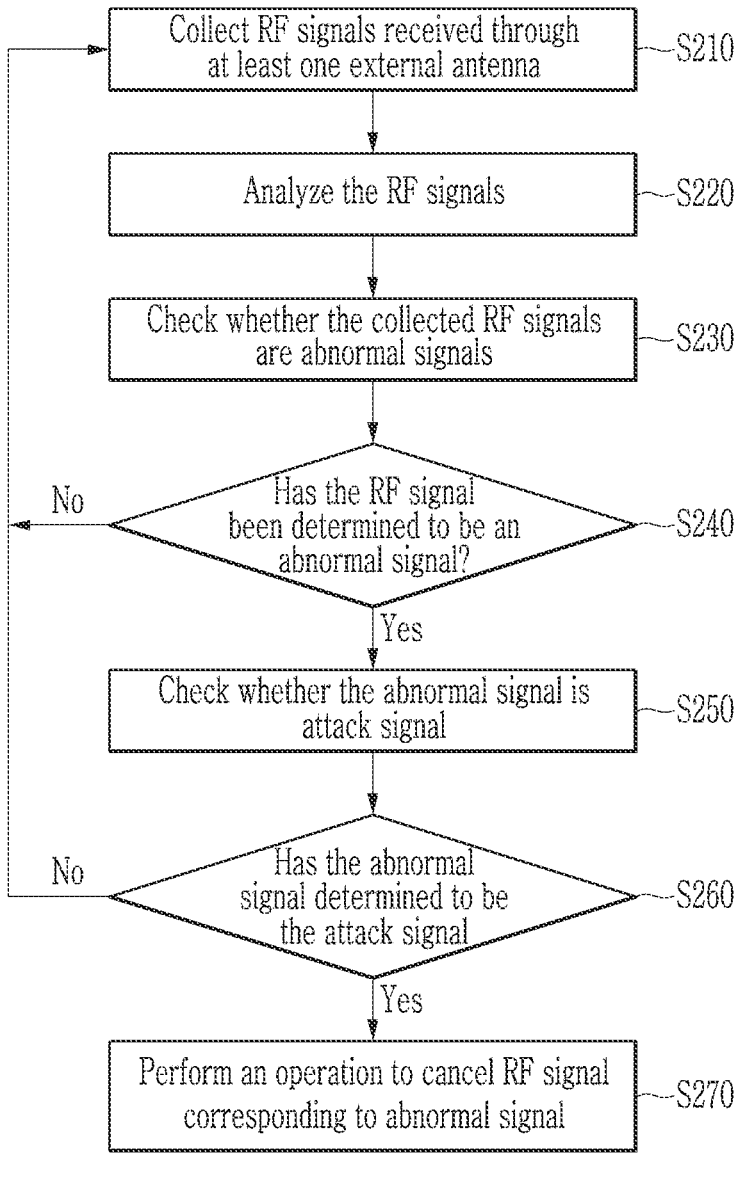
FIG. 2 is a flowchart illustrating an example of a method for defending against an external attack in the wireless attack mitigation apparatus shown in FIG. 1.

FIG. 2 is a flowchart illustrating an example of a method for defending against an external attack in the wireless attack mitigation apparatus shown in FIG. 1.

Referring to FIG. 2, the wireless attack mitigation apparatus 300 collects RF signals received through at least one external antenna 310 (S210).

The wireless attack mitigation apparatus 300 analyzes the collected RF signals (S220).

The wireless attack mitigation apparatus 300 checks whether the collected RF signals are abnormal signals through analysis of the collected RF signal (S230). Abnormal signals may include, for example, disturbing or malicious attack signals. In addition, the abnormal signals may include a signal that does not cause a communication error between the master BMS 200 and the plurality of slave BMSs 100a, 100b, 100c, and 100d, although the strength of the abnormal signals are different from that of normal signals. The normal signals are signals transmitted and received between the master BMS 200 and a plurality of slave BMSs 100a, 100b, 100c, and 100d, and may include signals including information of each battery module 20a, 20b, 20c, and 20d and/or signals including the control command of the master BMS 200. The wireless attack mitigation apparatus 300 may determine whether the collected RF signals are the abnormal signals based on the strength of the collected RF signals. The wireless attack mitigation apparatus 300 may determine that the collected RF signals are abnormal signals if the strength is equal to or greater than a first reference value (e.g., predetermined first reference value).

If it is determined that the collected RF signals are the abnormal signals (S240, yes), the wireless attack mitigation apparatus 300 checks whether the abnormal signal is an attack signal (S250). As an example of a method of determining whether an abnormal signal is an attack signal, the wireless attack mitigation apparatus 300 may determine that the abnormal signal is an attack signal if the strength of the abnormal signal is equal to or greater than a second reference value (e.g., predetermined second reference value). The second reference value may be set to be higher than the first reference value. Another example of a method of determining whether an abnormal signal is an attack signal will be described later based on FIGS. 3 and 4.

If it is determined that the abnormal signal is an attack signal (S260, yes), the wireless attack mitigation apparatus 300 may perform an attack defense operation.

As an example of an attack defense operation, the wireless attack mitigation apparatus 300 may perform an operation to cancel an RF signal corresponding to the abnormal signal (S270). The wireless attack mitigation apparatus 300 may generate a canceling RF signal having the same frequency, the same amplitude, and an opposite phase as the RF signal corresponding to the abnormal signal, and may transmit the canceling RF signals through at least one external antenna 310. The RF signals corresponding to the abnormal signals may be canceled by the canceling RF signals, and through this, the likelihood of a disturbance or malicious attack may be reduced or prevented.

As another example of the attack defense operation, the wireless attack mitigation apparatus 300 may instruct a frequency band change to the master BMS 200 to change the communication frequency band between the master BMS 200 and the plurality of slave BMSs 100a, 100b, 100c, and 100d.

Figure 3:
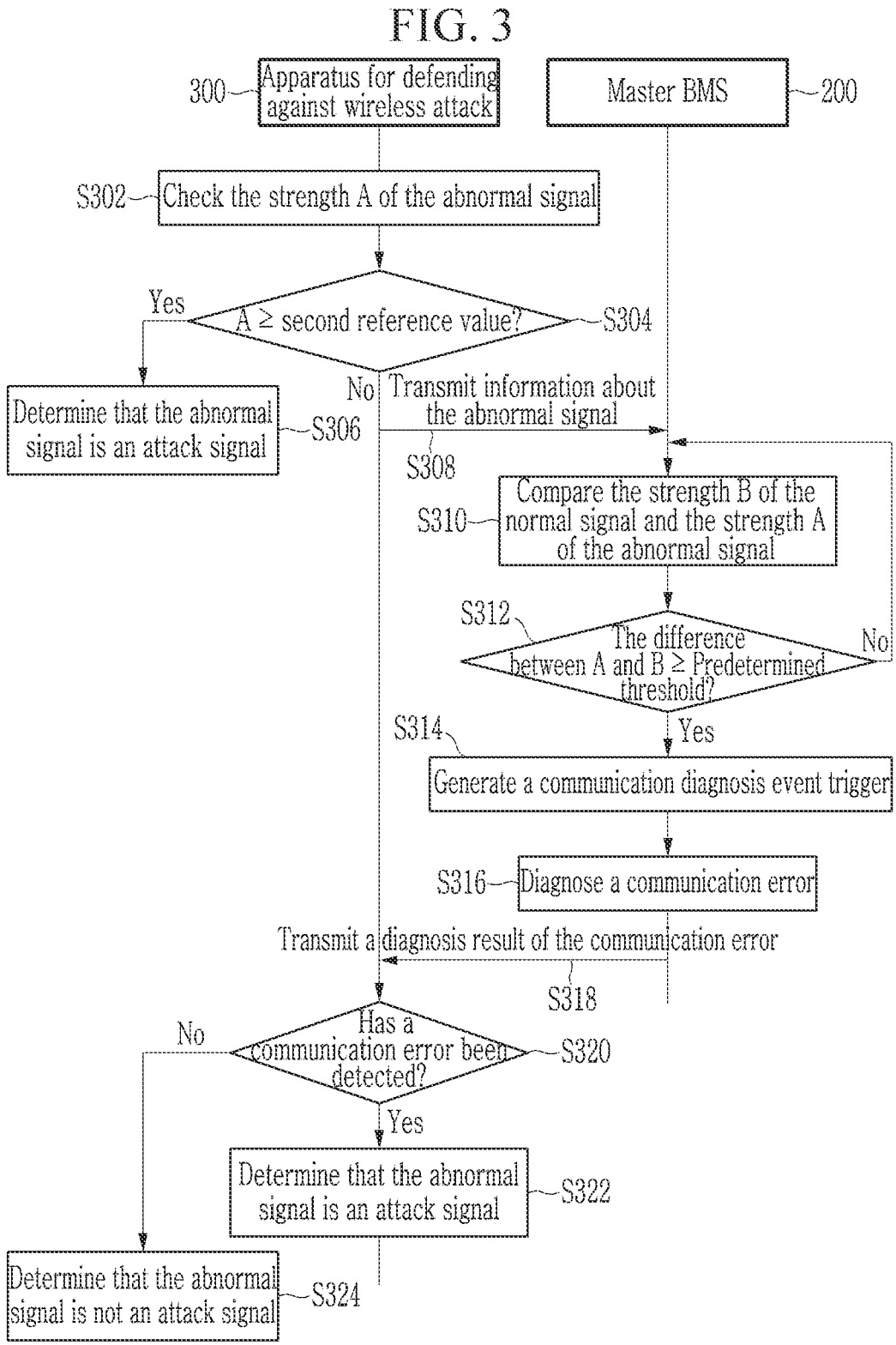
FIG. 3 is a diagram showing an example of a method for checking an attack signal in the wireless attack mitigation apparatus shown in FIG. 1.

FIG. 3 is a diagram showing an example of a method for checking an attack signal in the wireless attack mitigation apparatus shown in FIG. 1.

Referring to FIG. 3, the wireless attack mitigation apparatus 300 checks the strength A of the abnormal signal (S302).

If the strength A of the abnormal signal is equal to or greater than a second reference value (S304, yes), the wireless attack mitigation apparatus 300 may determine that the abnormal signal is an attack signal (S306). The second reference value may be set to a value capable of determining an attack signal based on the strength of the signal. That is, if the strength of the signal is equal to or greater than the second reference value, the corresponding signal may be determined to be an attack signal.

On the other hand, if the strength A of the abnormal signal is less than the second reference value (S304, no), the wireless attack mitigation apparatus 300 may perform a process of determining whether the abnormal signal is the attack signal.

If the strength A of the abnormal signals is less than the second reference value (S304), the wireless attack mitigation apparatus 300 may transmit information about the abnormal signal to the master BMS 200 (S308). The information on the abnormal signals may include, for example, the strength A of the abnormal signals.

The master BMS 200 may generate a communication diagnostic event trigger based on information on the abnormal signal. The master BMS 200 compares the strength B of the normal signal and the strength A of the abnormal signal (S310), and if the difference between the strength B of the normal signal and the strength A of the abnormal signal is greater than or equal to a threshold (e.g., predetermined threshold) (S312, yes), the master BMS 200 may generate the communication diagnosis event trigger (S314).

The master BMS 200 diagnoses a communication error with each slave BMS 100a, 100b, 100c, and 100d in response to the communication diagnosis event trigger (S316). The master BMS 200 may transmit a diagnosis result of the communication error with each slave BMS 100a, 100b, 100c, and 100d to the wireless attack mitigation apparatus 300 (S318).

If the wireless attack mitigation apparatus 300 confirms that the communication error has been detected based on the diagnosis result of the communication error (S320, yes), it can be determined that the abnormal signal is an attack signal (S322).

If the wireless attack mitigation apparatus 300 confirms that the communication error is not detected based on the diagnosis result of the communication error (S320, no), it can be determined that the abnormal signal is not an attack signal (S324).

Figure 4:
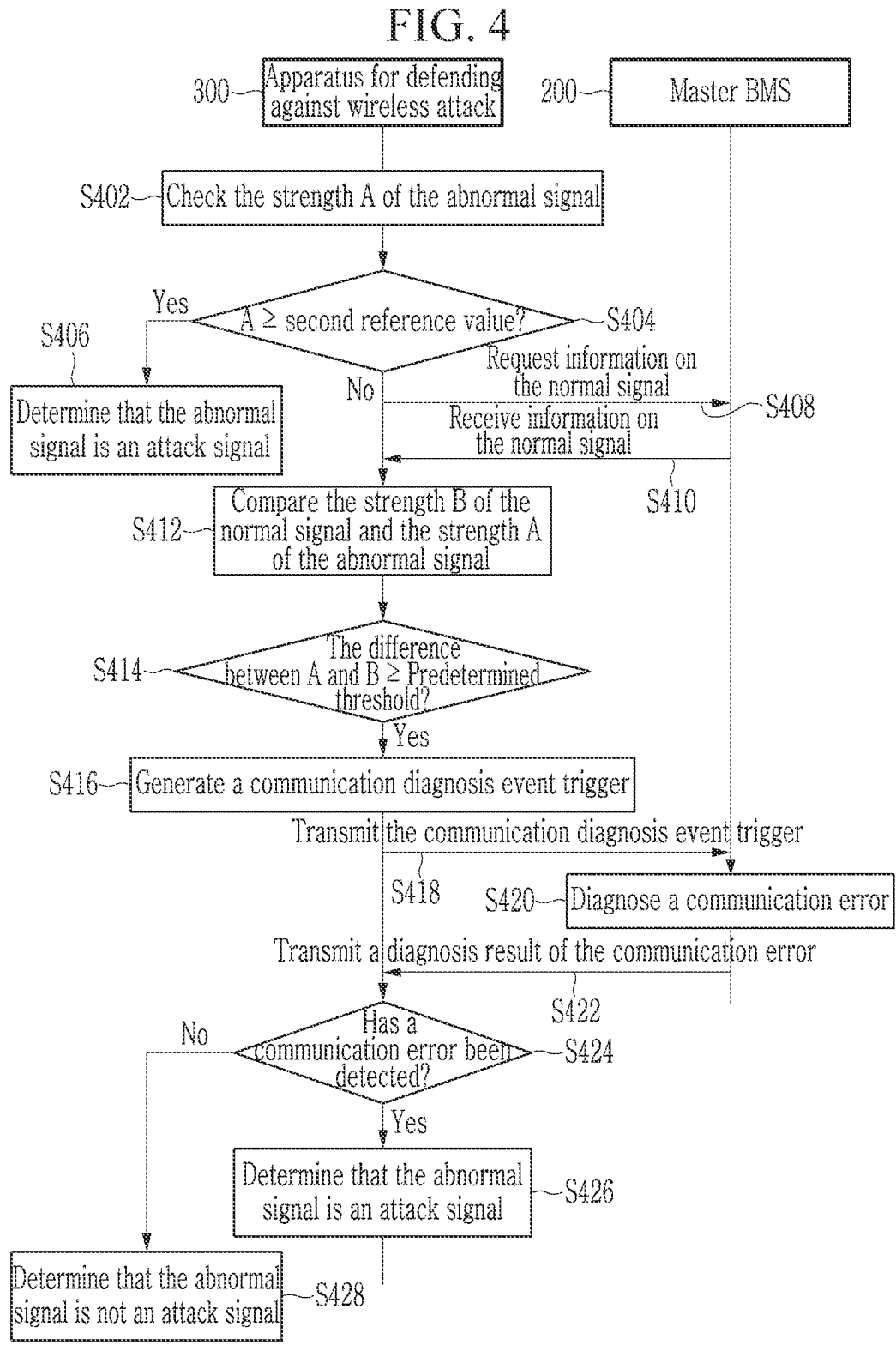
FIG. 4 is a flowchart illustrating another example of a method for checking an attack signal in the wireless attack mitigation apparatus shown in FIG. 1.

FIG. 4 is a flowchart illustrating another example of a method for checking an attack signal in the wireless attack mitigation apparatus shown in FIG. 1.

Referring to FIG. 4, the wireless attack mitigation apparatus 300 checks the strength A of the abnormal signal (S402).

If the strength A of the abnormal signal is equal to or greater than the second reference value (S404, yes), the wireless attack mitigation apparatus 300 may determine that the abnormal signal is an attack signal (S406).

On the other hand, if the strength A of the abnormal signal is less than the second reference value (S404, no), the wireless attack mitigation apparatus 300 may perform a process of determining whether the abnormal signal is the attack signal.

If the strength A of the abnormal signal is less than the second reference value (S404, no), the wireless attack mitigation apparatus 300 may request information on the normal signal from the master BMS 200 (S408).

The master BMS 200 may transmit information of the normal signal to the wireless attack mitigation apparatus 300 (S410). The information of the normal signal may include, for example, the strength B of the normal signal.

The wireless attack mitigation apparatus 300 may generate a communication diagnosis event trigger based on normal signal information. The wireless attack mitigation apparatus 300 compares the strength B of the normal signal and the strength A of the abnormal signal (S412), and if the difference between the strength B of the normal signal and the strength A of the abnormal signal is greater than or equal to a threshold (e.g., predetermined threshold) (S414, yes), the wireless attack mitigation apparatus 300 may generate the communication diagnosis event trigger (S416).

The wireless attack mitigation apparatus 300 may transmit the communication diagnosis event trigger to the master BMS 200 (S418).

The master BMS 200 diagnoses a communication error with each slave BMS 100a, 100b, 100c, and 100d in response to the communication diagnosis event trigger (S420). The master BMS 200 may transmit a diagnosis result of the communication error with each slave BMS 100a, 100b, 100c, and 100d to the wireless attack mitigation apparatus 300 (S422).

If the wireless attack mitigation apparatus 300 confirms that the communication error has been detected based on the diagnosis result of the communication error (S424, yes), it can be determined that the abnormal signal is an attack signal (S426).

If the wireless attack mitigation apparatus 300 confirms that the communication error is not detected based on the diagnosis result of the communication error (S424, no), it may be determined that the abnormal signal is not an attack signal (S428).

The wireless attack mitigation apparatus 300 may determine whether the collected RF signals are attack signals using various methods other than the method described above. For example, it is possible to determine whether the collected RF signals are attack signals through various methods capable of detecting an external intentional jamming attack, network traffic sniffing, network traffic spoofing attack, etc.

Figure 5:
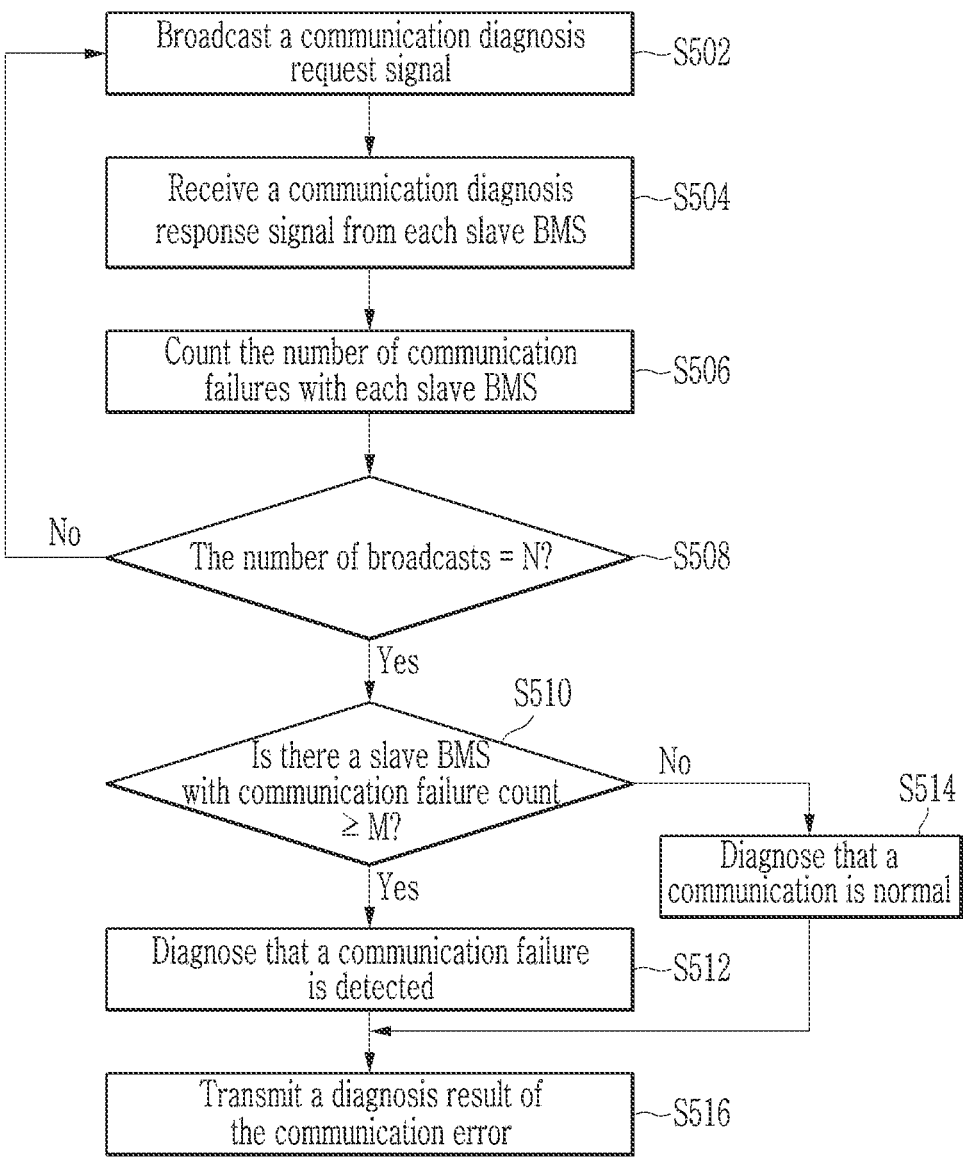
FIG. 5 is a diagram schematically illustrating a method for diagnosing a communication error in the master BMS shown in FIG. 1.

FIG. 5 is a diagram schematically illustrating a method for diagnosing a communication error in the master BMS shown in FIG. 1.

Referring to FIG. 5, the master BMS 200 may broadcast a communication diagnosis request signal to each slave BMS 100a, 100b, 100c, and 100d to diagnose a communication error (S502). Each slave BMS 100a, 100b, 100c, and 100d may transmit a communication diagnosis response signal to the master BMS 200 in response to the communication diagnosis request signal of the master BMS 200.

The master BMS 200 receives a communication diagnosis response signal corresponding to the communication diagnosis request signal from each slave BMS 100a, 100b, 100c, and 100d (S504).

The master BMS 200 counts the number of communication failures with each slave BMS 100a, 100b, 100c, and 100d (S506). If the master BMS 200 does not receive the communication diagnosis response signal corresponding to the communication diagnosis response request signal from each of the slave BMSs 100a, 100b, 100c, and 100d, it is determined that a communication failure has occurred, and a number of communication failures can be counted.

The master BMS 200 may broadcast a communication diagnosis request signal a number of times (e.g., predetermined number of times) N for a set time, and may receive a communication diagnosis response signal corresponding to the communication diagnosis request signal of the master BMS 200 from the slave BMSs 100a, 100b, 100c, and 100d.

The master BMS 200 may compare the number of broadcasts of the communication diagnosis request signal with a number of times (e.g., predetermined number of times) N (S508), and may repeat steps S502 to S506 until the number of broadcasts reaches a number of times (e.g., predetermined number of times) N.

Next, the master BMS 200 compares the number of communication failures with each slave BMS 100a, 100b,

100c, and 100d counted during the set time with a number of times (e.g., predetermined number of times) M.

The master BMS 200 may diagnose that, among the slave BMSs 100a, 100b, 100c, and 100d, if there is a slave BMS in which the number of communication failures during the set time is greater than the number of times (e.g., predetermined number of times) M (S510, yes), a corresponding communication failure is detected (S512).

On the other hand, if the number of communication failures with the slave BMSs 100a, 100b, 100c, and 100d during the set time is less than the set number of times M (S510, no), the master BMS 200 can diagnose that there is no communication error, that is, can diagnose that communication is normal (S514).

The master BMS 200 may transmit a diagnosis result of the communication error to the wireless attack mitigation apparatus 300 (S516).

Figure 6:
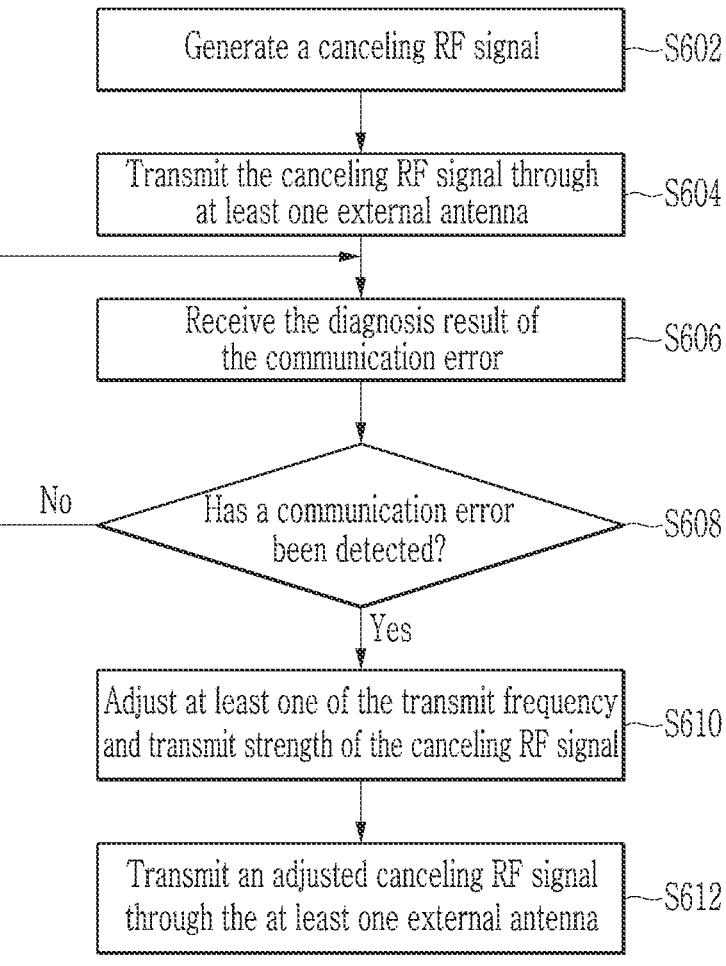
FIG. 6 is a flowchart illustrating an example of a method for canceling an RF signal corresponding to an attack signal in the wireless attack mitigation apparatus shown in FIG. 1.

FIG. 6 is a flowchart illustrating an example of a method for canceling an RF signal corresponding to an attack signal in the wireless attack mitigation apparatus shown in FIG. 1.

Referring to FIG. 6, the wireless attack mitigation apparatus 300 may generate a canceling RF signal having the same frequency and same amplitude and opposite phase to the RF signal corresponding to the abnormal signal (S602).

The wireless attack mitigation apparatus 300 may transmit the canceling RF signal through at least one external antenna 310 (S604).

Because the canceling RF signal has the same frequency and same amplitude as the RF signal corresponding to the attack signal, and has the opposite phase as the RF signal corresponding to the attack signal, the RF signal corresponding to the attack signal can be canceled by the cancelling RF signal, thereby reduce or preventing the likelihood of a disturbance or malicious attack.

On the other hand, if the communication error is detected as a result of the communication error diagnosis by the abnormal signal, the master BMS 200 may perform the communication error diagnosis (e.g., every set time interval), and transmit the diagnosis result of the communication error to the wireless attack mitigation apparatus 300.

The wireless attack mitigation apparatus 300 may receive the diagnosis result of the communication error from the master BMS 200 (S606).

If the wireless attack mitigation apparatus 300 confirms that the communication error has been detected based on the diagnosis result of the communication error (S608, yes), it may adjust at least one of the transmission frequency and transmission strength of the canceling RF signal (S610), and may transmit a canceling RF signal having the adjusted transmit frequency and transmit strength through at least one external antenna 310 (S612).

The wireless attack mitigation apparatus 300 may adjust the transmission frequency and transmission strength of the offset RF signal until the communication failure is not detected as a result of the communication error diagnosis of the master BMS 200.

Figure 7:
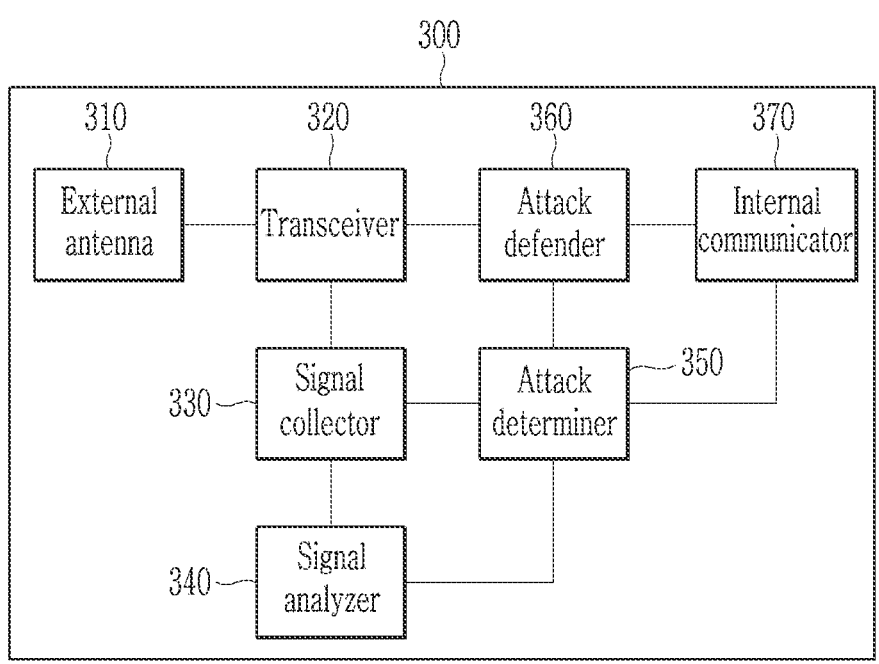
FIG. 7 is a diagram illustrating a wireless attack mitigation apparatus according to one or more embodiments.

FIG. 7 is a diagram illustrating a wireless attack mitigation apparatus according to one or more embodiments.

Referring to FIG. 7, the wireless attack mitigation apparatus 300 may include at least one external antenna 310, a transceiver 320, a signal collector 330, a signal analyzer 340, an attack determiner 350, an attack defender 360, and an internal communicator 370.

"The transceiver 320, the signal collector 330, the signal analyzer 340, the attack determiner 350, the attack defender 360, and the internal communicator 370, and/or any other electronic or electric devices and/or any other relevant devices or components according to embodiments of the present disclosure described herein may be implemented utilizing any suitable hardware (e.g., one or more circuits or circuitry), firmware (e.g. an application-specific integrated circuit), software, or a combination of hardware, firmware, and software. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate.

The at least one external antenna 310 may be located on a surface of a metal layer surrounding the battery pack 10. RF signals received through at least one external antenna 310 may be transmitted to the transceiver 320.

The transceiver 320 may transmit RF signals received through at least one external antenna 310 to the signal collector 330. Also, the transceiver 320 may transmit a canceling RF signal generated by the attack defender 360 to the outside through the external antenna 310.

The signal collector 330 may collect RF signals received through at least one external antenna 310, and may transfer the collected RF signals to the signal analyzer 340.

The signal analyzer 340 may analyze the collected RF signals. The signal analyzer 340 may analyze the frequency and strength of the collected RF signals. The signal analyzer 340 may transmit analysis information of the collected RF signals to the attack determiner 350.

The attack determiner 350 may determine whether the collected RF signals are abnormal signals based on analysis information of the collected RF signals. If the strength of the RF signal is greater than or equal to a first reference value (e.g., predetermined first reference value), the attack determiner 350 may determine the RF signal as an abnormal signal. If it is determined that the RF signal is an abnormal signal, the attack determiner 350 determines whether the abnormal signal is an attack signal. The attack determiner 350 may determine that the abnormal signal is an attack signal if the strength of the abnormal signal is high enough to be regarded as an attack signal. For example, if the strength of the abnormal signal is equal to or greater than the second reference value, it may be determined that the abnormal signal is an attack signal. In addition, the attack determiner 350 may determine that the abnormal signal is an attack signal based on the method described in FIG. 3 or FIG. 4.

If it is determined that the abnormal signal is an attack signal, the attack determiner 350 may transmit a defense instruction signal to the attack defender 360.

The attack defender 360 may perform an operation to cancel the RF signal corresponding to the abnormal signal in response to the defense instruction signal. The attack defender 360 may generate a canceling RF signal having the same frequency as, the same amplitude as, and an opposite phase as, the RF signal corresponding to the abnormal signal, and may transmit the canceling RF signal to the transceiver 320. In addition, the attack defender 360 may adjust at least one of the transmission frequency and transmission strength of the canceling RF signal based on the result of the re-diagnosis of the communication error of the master BMS 200.

The internal communicator 370 may transmit and receive RF signals to and from the master BMS 200.

Meanwhile, at least some functions of the wireless attack mitigation apparatus 300 may be performed in the master BMS 200. As an example, functions of the attack determiner 350 and the attack defender 360 may be implemented in the master BMS 200. As another example, functions of the signal collector 330, the signal analyzer 340, and the attack determiner 350 may be implemented in the master BMS 200. As another example, functions of the signal collector 330, the signal analyzer 340, the attack determiner 350, and the attack defender 360 may be implemented in the master BMS 200.

Figure 8:
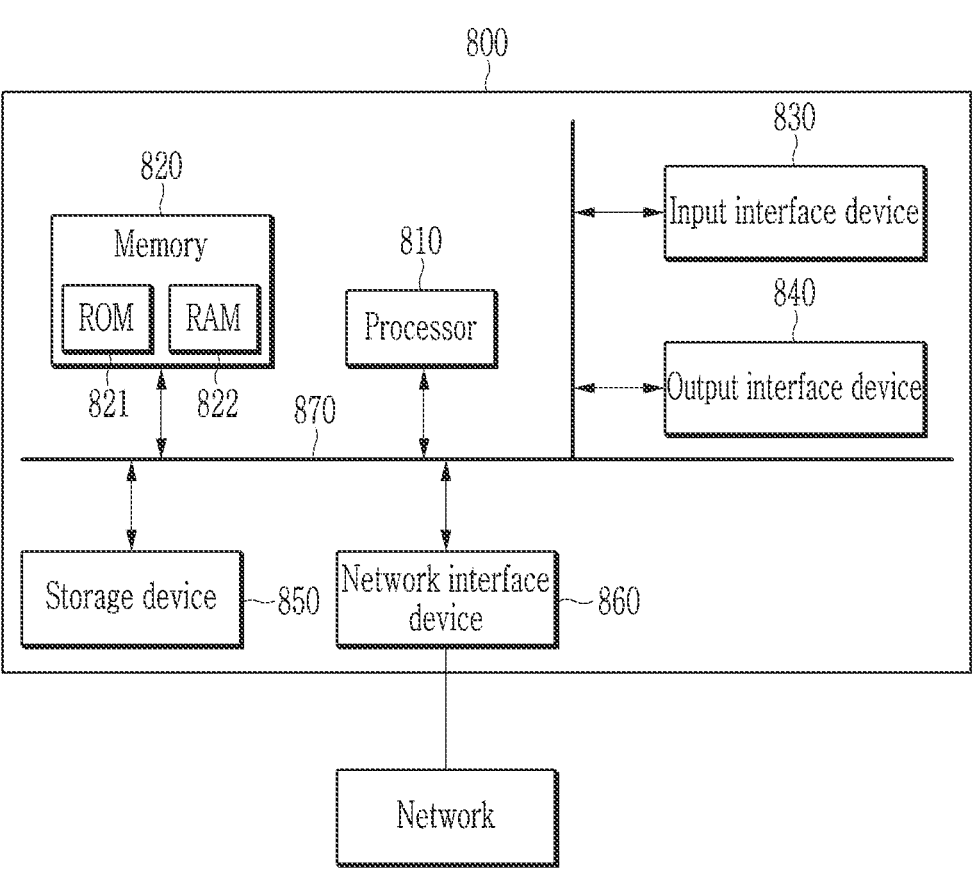
FIG. 8 is a diagram illustrating a wireless attack mitigation apparatus according to another embodiment.

FIG. 8 is a diagram illustrating a wireless attack mitigation apparatus according to another embodiment.

Referring to FIG. 8, the wireless attack mitigation apparatus 800 may represent a computing device in which the method for defending against wireless attack described above is implemented.

The wireless attack mitigation apparatus 800 may include at least one of a processor 810, a memory 820, an input interface device 830, an output interface device 840, a storage device 850, and a network interface device 860. Each of the components may be connected by a common bus 870 to communicate with each other. In addition, each of the components may be connected through an individual interface or a separate bus centering on the processor 810 instead of the common bus 870.

The processor 810 may be implemented as various types such as an application processor (AP), a central processing unit (CPU), a graphics processing unit (GPU), etc., and may be any semiconductor device that executes a command stored in the memory 820 or the storage device 850. The processor 810 may execute a program commands stored in at least one of the memory 820 and the storage device 850. The processor 810 stores program commands for implementing at least some functions of the transceiver 320, the signal collector 330, the signal analyzer 340, the attack determiner 350, and the attack defender 360 described with reference to FIG. 8 in the memory 820, and may control to perform the operation described with reference to FIGS. 1 to 8.

The memory 820 and the storage device 850 may include various types of volatile or non-volatile storage media. For example, the memory 820 may include a read-only memory (ROM) 821 and a random access memory (RAM) 822. The memory 820 may be located inside or outside the processor 810, and the memory 820 may be connected to the processor 810 through various known means.

The input interface device 830 is configured to provide input data to processor 810.

The output interface device 840 is configured to output data from processor 810.

The network interface device 860 may transmit or receive a signal with an external device through a wired network or a wireless network.

According to at least one of the embodiments, an external attack may be defended by detecting an external attack signal, and by performing an operation to cancel the external attack signal.

Furthermore, according to at least one of the embodiments, the likelihood of an unexpected abnormal operation of an electric vehicle may be reduced or prevented by responding to an external attack signal.

Although the embodiments have been described in detail above, the scope of the present disclosure is not limited thereto, and various modifications and improvements made by those skilled in the art using the basic concept of the present disclosure defined in the following claims are also included in the scope of the present disclosure, with functional equivalents of the claims to be included therein.

DESCRIPTION OF SOME OF THE REFERENCE
CHARACTERS

| | |
|---|---|
| 10: battery pack | 20a, 20b, 20c, 20d: battery module |
| 30: wireless battery management device | |
| 100a, 100b, 100c, 100d: Slave BMS | 200: Master BMS |
| 300: wireless attack mitigation apparatus | 310: external antenna |
| 320: transceiver | 330: signal collector |
| 340: signal analyzer | 350: attack determiner |
| 360: attack defender | 370: internal communicator |

What is claimed is:

1. A method for defending against wireless attack, the method comprising:

collecting external radio frequency (RF) signals through at least one external antenna;

determining an attack signal from the external RF signals;

canceling the attack signal by generating a canceling RF signal having an opposite phase as the attack signal;

broadcasting, by a master battery management system (BMS), a communication diagnosis request signal to at least one slave BMS a number (N) of times during a set period of time;

counting a number of times that a communication diagnosis response signal is not received from the at least one slave BMS, determining that a communication error has occurred when the counted number exceeds a number (M); and determining an abnormal signal as the attack signal when the communication error is detected.

2. The method as claimed in claim 1, wherein the determining the attack signal from the external RF signals comprises determining a strength of the attack signal is equal to or greater than a second reference value.

3. The method as claimed in claim 1, wherein the determining the attack signal from the external RF signals comprises:

determining a strength of the attack signal is greater than or equal to a first reference value, and is less than a second reference value; and determining a communication error diagnosis result between at least one slave battery management system (BMS) for detecting information on at least one battery module, and a master BMS for performing communication with the at least one slave BMS.

4. The method as claimed in claim 3, wherein the determining the attack signal from the external RF signals comprises detecting the communication error between the at least one slave BMS and the master BMS.

5. The method as claimed in claim 3, wherein the determining the attack signal from the external RF signals comprises:

receiving information about a strength of a normal signal transmitted between the at least one slave BMS and the master BMS from the master BMS;

determining a difference between the strength of the attack signal and the strength of the normal signal is equal to or greater than a threshold;

transmitting a communication diagnostic event trigger to the master BMS; and receiving the communication error diagnosis result.

6. The method as claimed in claim 1, wherein the determining the attack signal from the external RF signals comprises analyzing a strength of the attack signal.

7. The method as claimed in claim 1, wherein the canceling the attack signal comprises transmitting the canceling RF signal having a same frequency as the attack signal through the external antenna.

8. The method as claimed in claim 7, wherein the canceling the attack signal further comprises adjusting at least one of a frequency and a strength of the canceling RF signal based on a communication error diagnosis result between at least one slave battery management system (BMS) for detecting information on at least one battery module, and a master BMS for performing communication with the at least one slave BMS.

9. A wireless attack mitigation apparatus, the apparatus comprising:

at least one external antenna coupled to a battery pack, and configured to receive external radio frequency (RF) signals;

a signal analyzer configured to analyze the external RF signals;

an attack determiner configured to determine an attack signal, which corresponds to an external intentional jamming attack, network traffic sniffing, or network traffic spoofing, from the external RF signals using analysis information of the external RF signals;

an attack defender configured to cancel the attack signal by generating a canceling RF signal having an opposite phase as the attack signal;

broadcasting, by a master battery management system (BMS), a communication diagnosis request signal to at least one slave BMS a number (N) of times during a set period of time;

counting a number of times that a communication diagnosis response signal is not received from the at least one slave BMS, determining that a communication error has occurred when the counted number exceeds a number (M); and determining an abnormal signal as the attack signal when the communication error is detected.

10. The apparatus as claimed in claim 9, wherein the attack determiner is configured to determine the attack signal from the external RF signals based on a strength of the attack signal.

11. The apparatus as claimed in claim 9, wherein the attack determiner is configured to determine the attack signal from the external RF signals based on a strength of the attack signal being equal to or greater than a second reference value.

12. The apparatus as claimed in claim 9, wherein the attack determiner is further configured to:

determine a strength of the attack signal is greater than or equal to a first reference value and less than a second reference value; and determine the attack signal from the external RF signals based on a strength of a normal signal transmitted between at least one slave battery management system (BMS) for detecting information on at least one battery module, and a master BMS for performing communication with the at least one slave BMS, and based on a communication error diagnosis result between the at least one slave BMS and the master BMS.

13. The apparatus as claimed in claim 12, wherein the attack determiner is configured to determine the attack signal from the external RF signals based on the communication error between the at least one slave BMS and the master BMS being detected.

14. The apparatus as claimed in claim 12, further comprising an internal communicator configured to perform wireless communication with the master BMS, wherein the attack determiner is configured to:

determine that a difference between the strength of the attack signal and the strength of the normal signal is greater than or equal to a threshold;

generate a communication diagnosis event trigger;

transmit the communication diagnosis event trigger to the master BMS through the internal communicator; and receive the communication error diagnosis result.

15. The apparatus as claimed in claim 9, wherein the attack defender is configured to generate the canceling RF signal having a same frequency as the attack signal, and is configured to transmit the canceling RF signal through the external antenna.

16. The apparatus as claimed in claim 15, wherein the attack defender is configured to adjust at least one of a frequency and a strength of the canceling RF signal based on a communication error diagnosis result between at least one slave battery management system (BMS) for detecting information on at least one battery module, and a master BMS for performing communication with the at least one slave BMS.

17. A battery pack comprising:

at least one battery module;

at least one slave battery management system (BMS) configured to detect information about the at least one battery module;

a master BMS configured to perform wireless communication with the at least one slave BMS, and is configured to control the at least one slave BMS based on information about the at least one battery module; and a wireless attack mitigation apparatus configured to defend against a wireless attack, and comprising:

at least one external antenna configured to receive external radio frequency (RF) signals;

a signal analyzer configured to analyze the external RF signals;

an attack determiner configured to determine an attack signal, which corresponds to an external intentional jamming attack, network traffic sniffing, or network traffic spoofing, from the external RF signals using analysis information of the external RF signals;

an attack defender configured to cancel the attack signal by generating a canceling RF signal having an opposite phase as the attack signal;

broadcasting, by a master battery management system (BMS), a communication diagnosis request signal to at least one slave BMS a number (N) of times during a set period of time;

counting a number of times that a communication diagnosis response signal is not received from the at least one slave BMS, determining that a communication error has occurred when the counted number exceeds a number (M); and determining an abnormal signal as the attack signal when the communication error is detected.

* * * * *